UNITED STATES PATENT OFFICE.

LYMAN BRADLEY, OF BUFFALO, NEW YORK.

IMPROVEMENT IN PROCESSES OF PRESERVING FRUIT.

Specification forming part of Letters Patent No. 180,318, dated July 25, 1876; application filed November 30, 1874.

*To all whom it may concern:*

Be it known that I, LYMAN BRADLEY, of the city of Buffalo, in the county of Erie and State of New York, have invented a new and Improved Chemical Process for Preserving certain Fruits and Vegetables, of which the following is a specification:

Among the various methods which have been used for preserving fruits, vegetables, &c., previous to my invention, is one consisting in first subjecting the article to be preserved to the action of sulphurous-acid gas, and afterward to the action of heat, for the purpose of coagulating the albumen, thus partially cooking or parboiling the same. As the heat by this process tends to expel the acid with which the article has been previously impregnated, the fruit or other article to be preserved is required to be first charged with an excessive amount of gas, in order that a sufficient amount may remain after it has been subjected to the heated or parboiling process.

This process has been found objectionable for various reasons, among which are the following, viz: The heating process leaves the sulphurous acid unequally distributed throughout the article treated, the central portions of which, being less affected by the action of the steam or other heating agent, are left with a greater quantity of the acid than the outer, whereas, if there is to be any difference, the outer or exposed surface should contain the most; and, again, the heat to which the fruit or other article treated is subjected tends to expel the finer and more delicate flavor or aroma of the same, while at the same time the structure of the more delicate fruits is, in a great measure, destroyed or broken down, converting them frequently into a pulpy mass; and, furthermore, the quantity of acid required is such as to impair the flavor of the fruit, and frequently renders the same unfit for use, while the greatest care and delicacy of treatment is required to render the process in any case practicable.

An attempt was made to obviate the defects therein by an improved process invented by myself and one Thomas D. Phillips, and secured by Letters Patent numbered 99,628, and dated February 8, 1870, which consisted in subjecting the fruit, &c., to the application of steam impregnated with the sulphurous-acid gas. While this last process overcame some of the defects of the first-described process, yet it failed to remedy the more serious difficulty resulting from the application of steam and heat.

My invention consists in subjecting certain fruits and vegetables, properly prepared, to the action of sulphurous-acid gas, and afterward placing the articles to be preserved thus treated in suitable vessels, and then filling the vessels with cold water, so as to completely submerge the articles therein.

In order that the difficulties attending the preserving of fruits for a long period may be properly appreciated, the fact must be borne in mind that there is a special tendency for preserved fruits, upon the return of the season for their growth and development, to ferment and decompose, and that many processes which will readily preserve fruit until the return of such season are entirely inadequate to preserve fruits through and beyond such season. This fact, and the fact that the treatment of each variety of fruit, and in its different conditions, required to be correspondingly varied as to degree and duration, have necessitated repeated, long-continued, and varied experiments, in order to properly test the practicability and efficiency of my invention as a general process for the preservation of different fruits and vegetables.

In experimenting with and using my improved process, I have employed the following described apparatus, viz: Wooden boxes four feet long, twenty inches wide, and twenty inches deep, inside measure, with tight covers, in which I have used crates or racks, arranged one above the other, in which are placed the articles to be preserved in two tiers, leaving a space of a few inches between the tiers at center of the box, in which a sulphur match is placed and lighted, and the lid of the box closed. The crates are so arranged as to allow a free circulation of the gas around and between the crates, and through the articles to be preserved. These sulphur matches I prepare by dipping coarse sheeting in melted sulphur, a piece thus prepared about four inches square being sufficient to fill the box with gas for the purpose desired; if a larger piece be employed it will become extinguished when the box is completely filled with the gas.

As the length of time during which the different fruits and vegetables should be subjected to the action of the gas in the box varies considerably, a particular statement of the time required for each will be necessary in order to enable my process to be successfully used. It must, however, be borne in mind that a longer time is required to impregnate with the gas the larger size or pieces of the articles to be preserved than the smaller, and that a longer time is also required for a hard or unripe condition of the article than for the fully ripe and softer condition, the length of time depending in a great measure upon the facility or difficulty with which the gas permeates the article.

For preserving apples, I first prepare them for treatment by paring and cutting into eight to twelve pieces, according to their size. I then place them on the crates in the box, light the match, and close the box, and allow them to remain therein from four to eight minutes, according to the condition of the apple as to hardness or softness. The apples are then emptied into the barrel or other vessel in which they are to be kept. Then the vessel is filled with cold water, and closed, and the article is now ready for market.

For treating pears, I prepare the larger varieties the same as apples, and subject them to the action of the gas from seven to ten minutes. The smaller kinds I preserve whole, and allow them to remain in the box from three to five minutes.

For preserving peaches, the pits or stones are first removed, when they are treated in the same manner and for the same length of time as apples—viz., from four to eight minutes.

In treating plums, when the pits are removed they should remain in the box about ten minutes, and when the pits are not removed they should remain in the box from fifteen to twenty minutes.

Cherries I preserve with the pits in, and subject them to the gas from seven to ten minutes.

Currants, ripe, require treatment with the gas from ten to twelve minutes; when green, from twelve to fifteen minutes.

Gooseberries, ripe, require from fifteen to eighteen minutes; when green, from forty to forty-five minutes.

Raspberries of the black-cap variety require from five to eight minutes; the Antwerp and other large varieties, about ten minutes. Strawberries, fully ripe and the ordinary size, three and one-half minutes; smaller sizes, from two and one-half to three minutes. Blackberries, from three to five minutes. Tomatoes, whole, ripe, from five to twenty minutes, according to size; partially ripe, from ten to twenty-five minutes. Rhubarb or pie-plant, cut into pieces three-fourths of an inch in length, from twenty to thirty minutes, according to diameter of the stalks.

All of the foregoing articles, after having been impregnated with the gas, as above described, are put into jars, barrels, or other suitable receptacles, then filled with cold water, and closed up, as in the case of the apples, above described, so as to prevent the escape or evaporation of the water.

While it is not essential to my improved process that the vessels be air-tight, it is desirable that the air be excluded so far as it can be conveniently, as the free exposure to the air may, in some cases, result in the conversion of the sulphurous acid contained in the water into sulphuric acid by the absorption of oxygen from the atmosphere, the sulphuric acid tending to break down the tissue of the fruit or vegetables.

The directions as to the length of time during which the various articles should remain in the acid-impregnating box should be carefully observed, as I have found that a slight variation in the length of this time will result in most instances either in fermentation from too little acid, or in rendering the article unpalatable by an excess of acid.

While I prefer to use cold water with my improved process, and have so described the same, I have used the term "cold water" as including tepid or moderately-warm water, as contradistinguished from hot water, or water of so high a temperature as to scald or partially cook the fruit or other articles.

In treating such fruits as are designed for table use without cooking, the water with which the jar or other vessel containing the fruit is filled may be sweetened, if desired, so as to render the fruit palatable without further preparation when the same shall be required for use.

I do not wish to confine myself to the particular apparatus or means above described for impregnating the articles with the sulphurous-acid gas, as any other suitable means may be employed which will enable the articles to be properly impregnated with the gas.

I have described the above apparatus as the one which I have used, and as a convenient means for enabling the public to successfully use my process.

What I claim as my invention is—

The process of treating the various fruits and vegetables above enumerated, for the purpose of preserving them in a raw or uncooked state, by first impregnating them with sulphurous-acid gas, and then filling the barrels or other vessels in which they are afterward placed with cold water, so as to submerge the articles therein, substantially as and for the purpose hereinbefore set forth.

LYMAN BRADLEY.

Witnesses:
M. B. MOORE,
JNO. J. BONNER.